(12) United States Patent
Crispin

(10) Patent No.: US 10,060,702 B2
(45) Date of Patent: *Aug. 28, 2018

(54) DUAL FIELD OPTICAL AIMING SYSTEM FOR PROJECTILE WEAPONS

(71) Applicant: Leupold & Stevens, Inc., Beaverton, OR (US)

(72) Inventor: Quint Crispin, Beaverton, OR (US)

(73) Assignee: Leupold & Stevens, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/441,126

(22) Filed: Feb. 23, 2017

(65) Prior Publication Data

US 2017/0321993 A1 Nov. 9, 2017

Related U.S. Application Data

(63) Continuation-in-part of application No. 15/431,594, filed on Feb. 13, 2017, now abandoned, which is a
(Continued)

(51) Int. Cl.
*F41G 1/38* (2006.01)
*F41G 1/387* (2006.01)
(Continued)

(52) U.S. Cl.
CPC .............. *F41G 1/387* (2013.01); *F41G 1/30* (2013.01); *F41G 1/38* (2013.01); *G02B 23/14* (2013.01)

(58) Field of Classification Search
CPC ... F41G 1/387; F41G 1/30; F41G 1/38; G02B 23/14
See application file for complete search history.

(56) References Cited

U.S. PATENT DOCUMENTS 1,563,373 A 12/1925 Kauch
2,225,037 A * 12/1940 Dake .................... F41G 1/38
356/254

(Continued)

FOREIGN PATENT DOCUMENTS

CA 670887 A 9/1963
EP 0234180 A1 9/1987
(Continued)

OTHER PUBLICATIONS

Wikipedia, Holographic Weapon Sight, en.wikipedia.org/wiki/Holographic_weapon_sight, published Jan. 28, 2013, 2 pages.
(Continued)

*Primary Examiner* — Samir Abdosh
(74) *Attorney, Agent, or Firm* — Stoel Rives LLP

(57) ABSTRACT

A system for aiming a projectile weapon includes a telescopic sight for use with a second sighting device, such as a reflex sight or other non-magnifying sight. The telescopic sight has an eye point spaced apart rearwardly from its eyepiece and positioned at a vertical plane containing a line of initial trajectory of the weapon to which the aiming system is mounted so that a line parallel to the line of initial trajectory does not intersect the eyepiece. The location of the eye point facilitates concurrent use of a second sighting device at a normal mounting height and viewable past the eyepiece, thereby allowing the viewer to change views between the telescopic sight and the second sighting device with little eye movement and essentially no head movement.

26 Claims, 12 Drawing Sheets

Related U.S. Application Data continuation-in-part of application No. 14/834,272, filed on Aug. 24, 2015, now Pat. No. 9,568,277, which is a continuation of application No. 13/843,445, filed on Mar. 15, 2013, now Pat. No. 9,115,958.

(51) Int. Cl.
*G02B 23/14* (2006.01)
*F41G 1/30* (2006.01)

(56) References Cited

U.S. PATENT DOCUMENTS

| | | | |
|---|---|---|---|
| 2,388,673 | A | 11/1945 | Brown |
| 2,512,153 | A | 6/1950 | Henyey et al. |
| 2,527,719 | A * | 10/1950 | Greenstein .......... G02B 15/00 359/420 |
| 3,339,450 | A | 9/1967 | Reed |
| 3,655,260 | A | 4/1972 | Bartucci |
| 3,992,782 | A | 11/1976 | Rickert |
| 4,118,109 | A | 10/1978 | Crawford |
| 4,545,655 | A | 10/1985 | Fantone et al. |
| 4,582,400 | A | 4/1986 | Lough |
| 4,877,318 | A | 10/1989 | Miles |
| 5,084,780 | A | 1/1992 | Phillips |
| 5,161,051 | A | 11/1992 | Whitney et al. |
| 5,349,469 | A | 9/1994 | Francis |
| 5,383,278 | A | 1/1995 | Kay |
| D369,363 | S | 5/1996 | Palmer |
| 5,652,679 | A * | 7/1997 | Freeman ............ G02B 17/0812 359/364 |
| 5,740,485 | A * | 4/1998 | Miyamoto ............ G02B 23/14 396/384 |
| 5,862,001 | A | 1/1999 | Sigler |
| 5,877,902 | A | 3/1999 | Sauter |
| D413,130 | S | 8/1999 | Bryant et al. |
| 6,005,711 | A | 12/1999 | Mai et al. |
| 6,282,021 | B1 | 8/2001 | Yano |
| D449,899 | S | 10/2001 | Hayakawa et al. |
| 6,327,806 | B1 | 12/2001 | Paige |
| 6,363,648 | B1 | 4/2002 | Kranich et al. |
| 6,487,809 | B1 | 12/2002 | Gaber |
| 6,598,333 | B1 | 7/2003 | Randazzo et al. |
| 6,608,298 | B2 | 8/2003 | Gaber |
| 6,687,053 | B1 | 2/2004 | Holmes et al. |
| D490,921 | S | 6/2004 | Ashfield et al. |
| D522,031 | S | 5/2006 | Siu |
| 7,072,107 | B2 | 7/2006 | Filipovich et al. |
| 7,142,357 | B2 | 11/2006 | Greenslade |
| D580,961 | S | 11/2008 | Ciccone, Jr. et al. |
| 7,522,336 | B2 | 4/2009 | Whitty |
| D599,924 | S | 9/2009 | Schoch |
| 7,752,798 | B2 * | 7/2010 | Mayerle .................. F41G 1/41 42/118 |
| 7,827,723 | B1 | 11/2010 | Zaderey et al. |
| 8,056,245 | B2 | 11/2011 | Cranton et al. |
| D669,930 | S | 10/2012 | Koyama et al. |
| D694,800 | S | 12/2013 | Miyashita |
| D712,001 | S | 8/2014 | Wells |
| D741,446 | S | 10/2015 | Cheng et al. |
| 9,291,808 | B2 | 3/2016 | Feinberg |
| D757,147 | S | 5/2016 | Edwards et al. |
| 2004/0075894 | A1 | 4/2004 | Shafer et al. |
| 2005/0039370 | A1 | 2/2005 | Strong |
| 2009/0224154 | A1 | 9/2009 | Jancic et al. |
| 2011/0026012 | A1 | 2/2011 | Barth |
| 2011/0035980 | A1 | 2/2011 | Raviv et al. |
| 2011/0041377 | A1 | 2/2011 | Thomas et al. |
| 2011/0067288 | A1 | 3/2011 | Hakansson et al. |
| 2011/0199677 | A1 | 8/2011 | Shick et al. |
| 2011/0232152 | A1 | 9/2011 | Thomas et al. |
| 2012/0013528 | A1 | 1/2012 | Browe et al. |
| 2012/0192478 | A1 | 2/2012 | Jahromi |
| 2012/0268920 | A1 | 10/2012 | Matthews et al. |
| 2013/0008072 | A1 | 1/2013 | Chung |
| 2014/0190063 | A1 | 7/2014 | Lau |
| 2014/0259853 | A1 | 9/2014 | Crispin |
| 2014/0305022 | A1 | 10/2014 | Chung |
| 2016/0061568 | A1 | 3/2016 | Crispin |
| 2016/0116254 | A1 | 4/2016 | Jahromi |
| 2016/0356572 | A1 | 12/2016 | Jahromi |
| 2016/0356575 | A1 | 12/2016 | Jahromi |

FOREIGN PATENT DOCUMENTS

| | | |
|---|---|---|
| EP | 2 557 450 A1 | 2/2013 |
| WO | WO 2012/058453 A2 | 5/2012 |

OTHER PUBLICATIONS

L-3 Communications, EOTech Holographic Weapons Systems, HHS II, www.eotech-inc.com/products/sights/hhs2, visited Mar. 7, 2013, 2 pages.

European Search Report dated May 19, 2014 for European Application No. 14160137.7.

Reviews & Ratings for Bushnell 4.5x40 Equinox Z Digital Night Vision Monocular 10 reviews, posted at Optics Planet, comment posting date Jun. 25, 2014. [online], [site visited Oct. 14, 2016]. Available from Internet, <URL: http://www.opticsplanet.com/reviews/reviews-bushnell-3x30-equinox-digital-night-vision-monocular-qcsdm.html>.

* cited by examiner

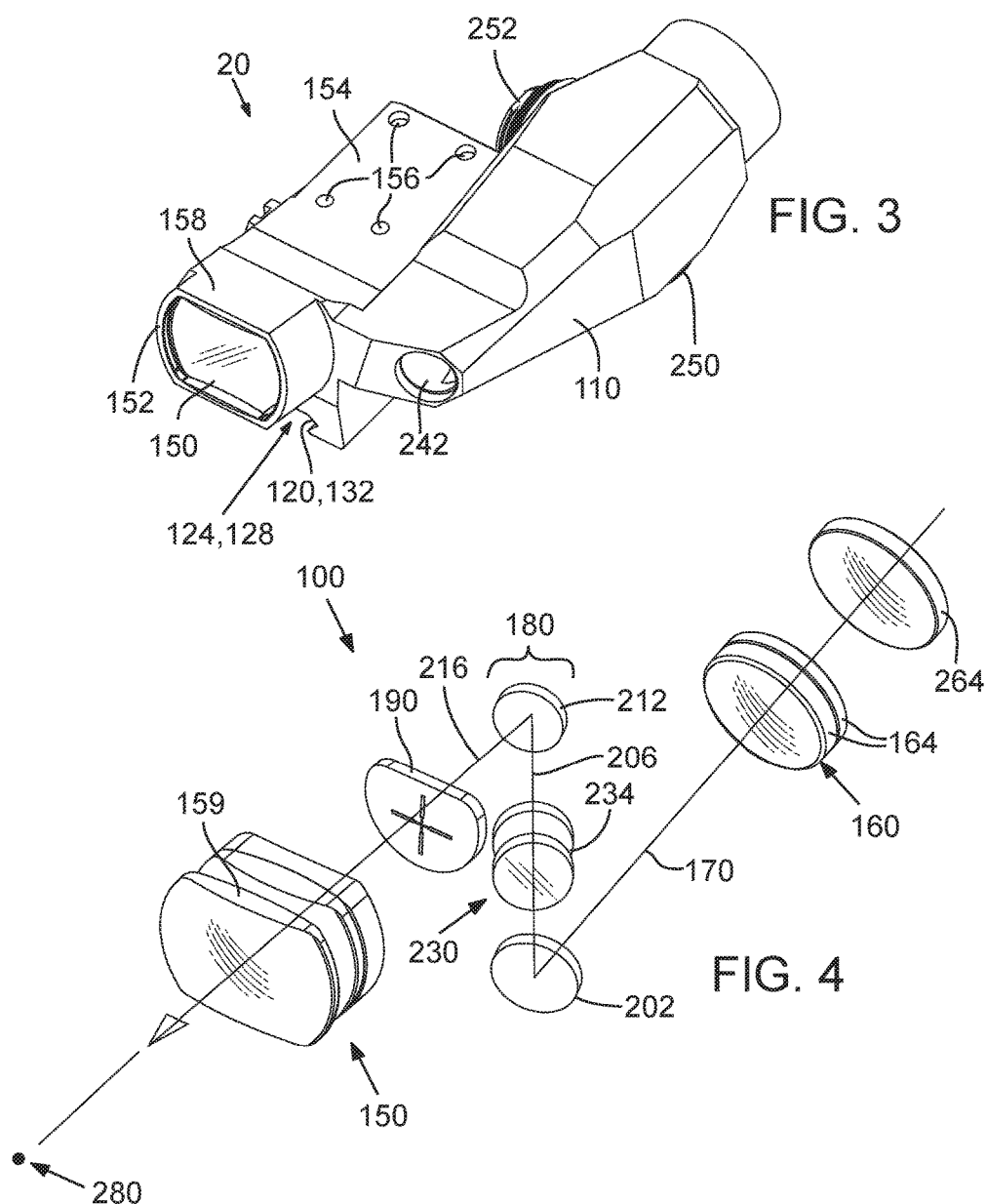

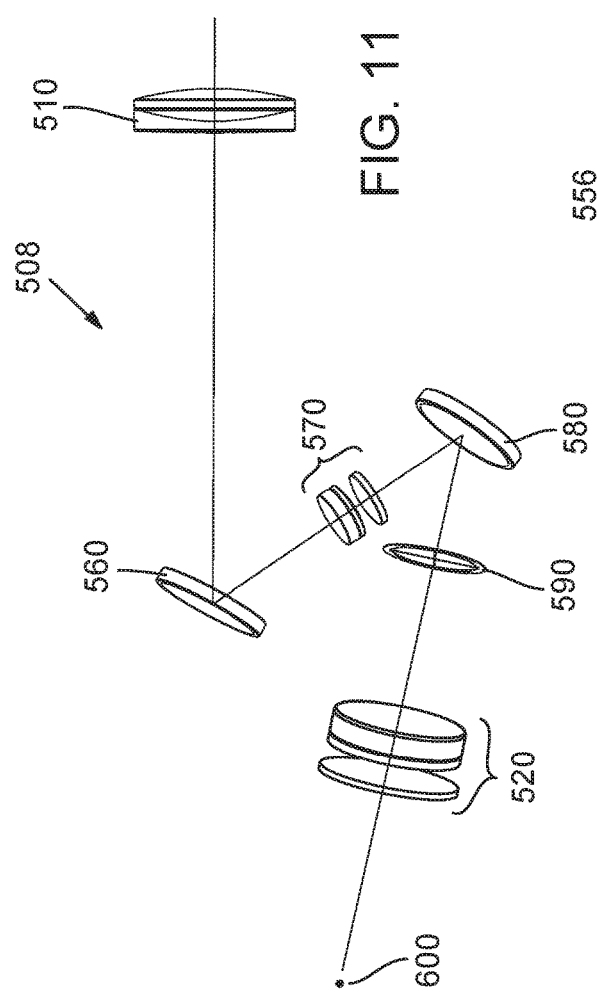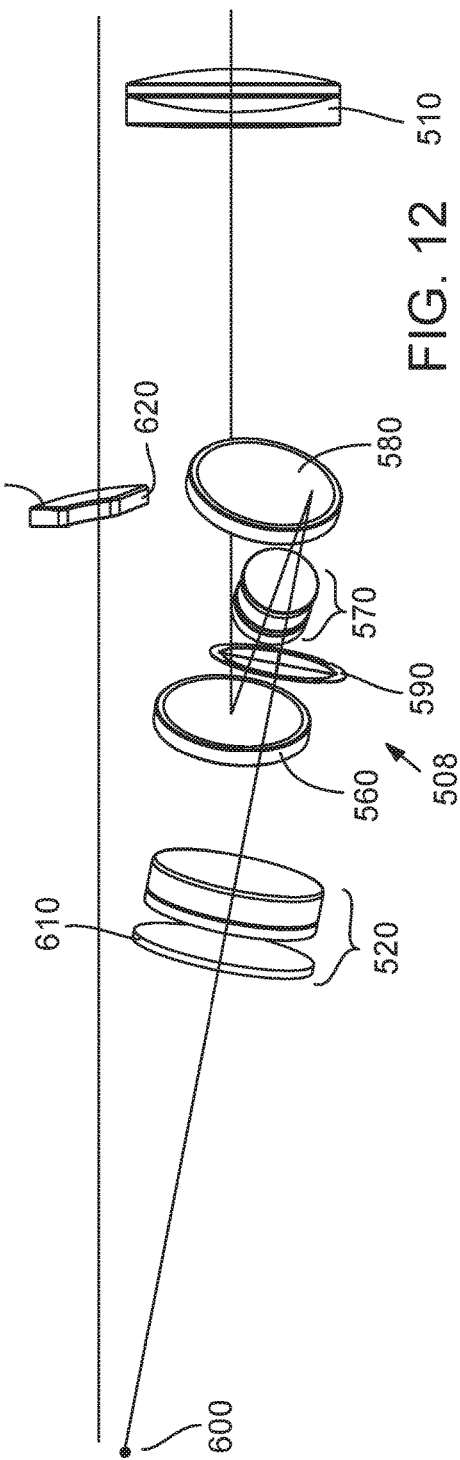

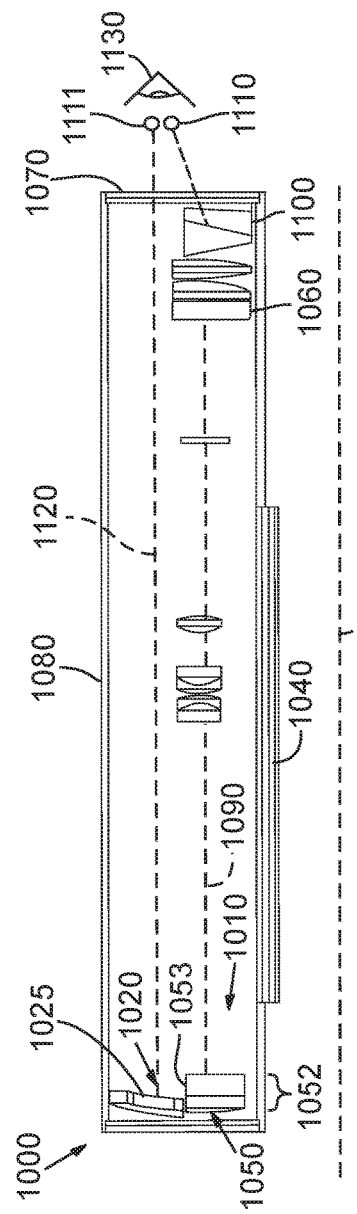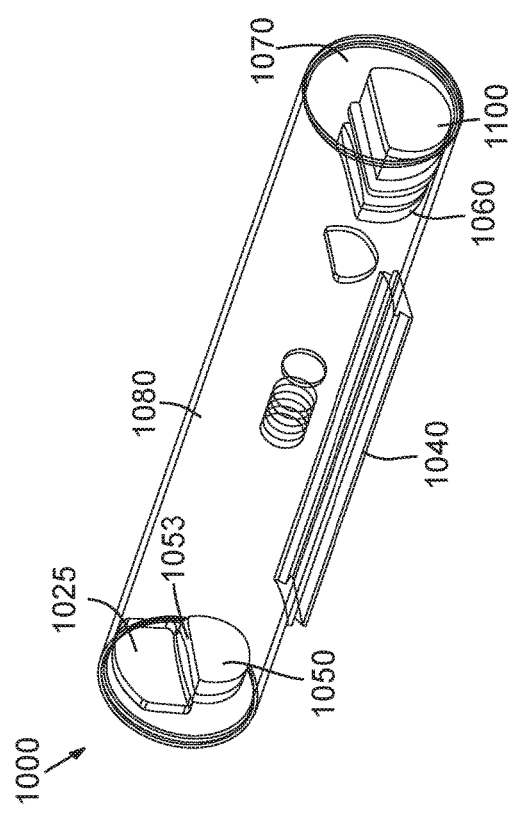

DUAL FIELD OPTICAL AIMING SYSTEM FOR PROJECTILE WEAPONS

RELATED APPLICATION DATA

This application is a continuation-in-part of and claims the benefit under 35 U.S.C. § 120 from U.S. patent application Ser. No. 15/431,594, filed Feb. 13, 2017, which is a continuation-in-part of U.S. patent application Ser. No. 14/834,272 (now U.S. Pat. No. 9,568,277), filed Aug. 24, 2015, which is a continuation of U.S. patent application Ser. No. 13/843,445, filed Mar. 15, 2013 (now U.S. Pat. No. 9,115,958) and entitled "DUAL FIELD OPTICAL AIMING SYSTEM FOR PROJECTILE WEAPONS," the disclosures of which are each incorporated by reference herein in their entireties.

TECHNICAL FIELD

The field of the present disclosure relates to sighting systems for projectile weapons and, more particularly, to a telescopic sight designed for use in conjunction with a reflex sight or other non-magnifying sight.

BACKGROUND

Conventional riflescopes and other telescopic sights accomplish magnification changes by optical elements that are either movable along the optical path, or that are switched into and out of the optical path. Also known are sight designs utilizing switching mirrors and/or beam splitters for switching between one of two different optical systems alternately viewable through a common eyepiece. Some sights include optical paths for day and night operation, including visible and infrared channels, which may be combined and superimposed for viewing as a composite image. In many of these systems, components of the sight must be manually moved to switch between viewing modes, which makes the sight more complicated, prone to image instability or misalignment, cumbersome and slow for switching between modes, and prone to making noise.

U.S. Pat. No. 2,388,673 of Brown, U.S. Pat. No. 2,512,153 of Henvey et al., and U.S. Pat. No. 2,527,719 of Greenstein et al. describe dual optical power split-field telescopic sights utilizing different lenses or lens segments for upper and lower portions of the optical system. These telescopic sights utilize complex lens systems and optical prescriptions, and are limited by a shared eyepiece through which both fields are simultaneously viewed.

The present inventors have recognized a need for an aiming system that facilitates viewing a target scene through a telescopic sight and through a second sight having a different field of view or aiming capability, such as a non-magnifying reflex sight providing a wide field of view, very little field obstruction, and fast target acquisition. Such an aiming system may facilitate concurrent use of the second sighting device at a normal mounting height and viewable past the eyepiece of the telescopic sight, thereby allowing the viewer to change views between the telescopic sight and the second sighting device with little eye movement and essentially no head movement.

Various known systems utilize a miniature reflex sight (also known as a red-dot sight) mounted atop a telescopic sight, but the height of the viewing region of the reflex sight in such systems is generally much higher than the exit pupil of the telescopic sight and too high for achieving a cheek weld with the rifle stock (buttstock) as is desirable for stable aiming. In such systems, substantial head movement is also needed to switch between the two sights. The required head movement can be cumbersome and slow, particularly when switching from the reflex sight to the telescopic sight and re-aligning the eye with the typically small exit pupil of the telescopic sight.

SUMMARY

In accordance with the present disclosure, a telescopic sight of a projectile weapon aiming system includes a housing supporting an optical system of the telescopic sight relative to a mounting surface of the sight, which may include an integrated mounting bracket or clamp at least partly formed in the housing. The optical system includes an objective lens system that produces an image of a distant target at a focal plane, and an eyepiece positioned rearward of the focal plane and along an optical axis of the objective lens system.

A light redirection device, such as a wedge prism, a Risley prism, or other suitable prism device, is positioned rearward of both the objective lens system and the eyepiece and along the optical axis. The light redirection device defines an eye point spaced apart rearwardly therefrom at which the image of the distant target is viewable. When the telescopic sight is mounted to the projectile weapon, the eye point is located at a place on a plane offset from the optical axis. In some embodiments, the eye point may be vertically offset from the optical axis such that a line intersecting the eye point does not intersect the eyepiece.

Preferably, the offset eye point facilitates concurrent use of a second sighting device, such as a non-magnifying reflex sight or holographic weapon sight, that may be viewable beyond the eyepiece, thereby allowing the viewer to change views between the telescopic sight and the non-magnifying sight with little eye movement and essentially no head movement. It may also enable a shooter to change views between the two sights without breaking cheek weld with a stock of the weapon.

In some embodiments, the non-magnifying sight and telescopic sight are each independently mountable in tandem on a common mounting rail of the projectile weapon. In other embodiments, the non-magnifying sight may share a common housing with the telescopic sight, where a viewing window of the non-magnifying sight is positioned above the objective to allow the viewer to quickly change views between the telescopic and non-magnifying sight. Other mounting arrangements may also be possible.

Additional aspects and advantages will be apparent from the following detailed description of preferred embodiments, which proceeds with reference to the accompanying drawings.

BRIEF DESCRIPTION OF THE DRAWINGS

FIG. 3 is an isometric view of the telescopic sight component of the aiming system of FIGS. 1-2, with the rifle and reflex sight omitted to show detail;

FIG. 4 is an isometric view of an optical system of the telescopic sight of FIG. 3, annotated to trace an optical path of the telescopic sight;

FIG. 11 is a top plan view of an optical system of the aiming system of FIGS. 8-10, with a reflex sight viewing window omitted;

FIG. 12 is a right side elevation view of the optical system of FIG. 11, together with a viewing window of a reflex sight of the aiming system of FIGS. 8-10;

FIG. 15 is a schematic view of an optical aiming system including a telescopic sight and a non-magnifying sight mounted in a common housing, with a light redirection device positioned behind the eyepiece, according to another embodiment.

FIG. 16 is a schematic perspective view of the optical aiming system of FIG. 15.

DETAILED DESCRIPTION OF PREFERRED EMBODIMENTS

Figure 1:
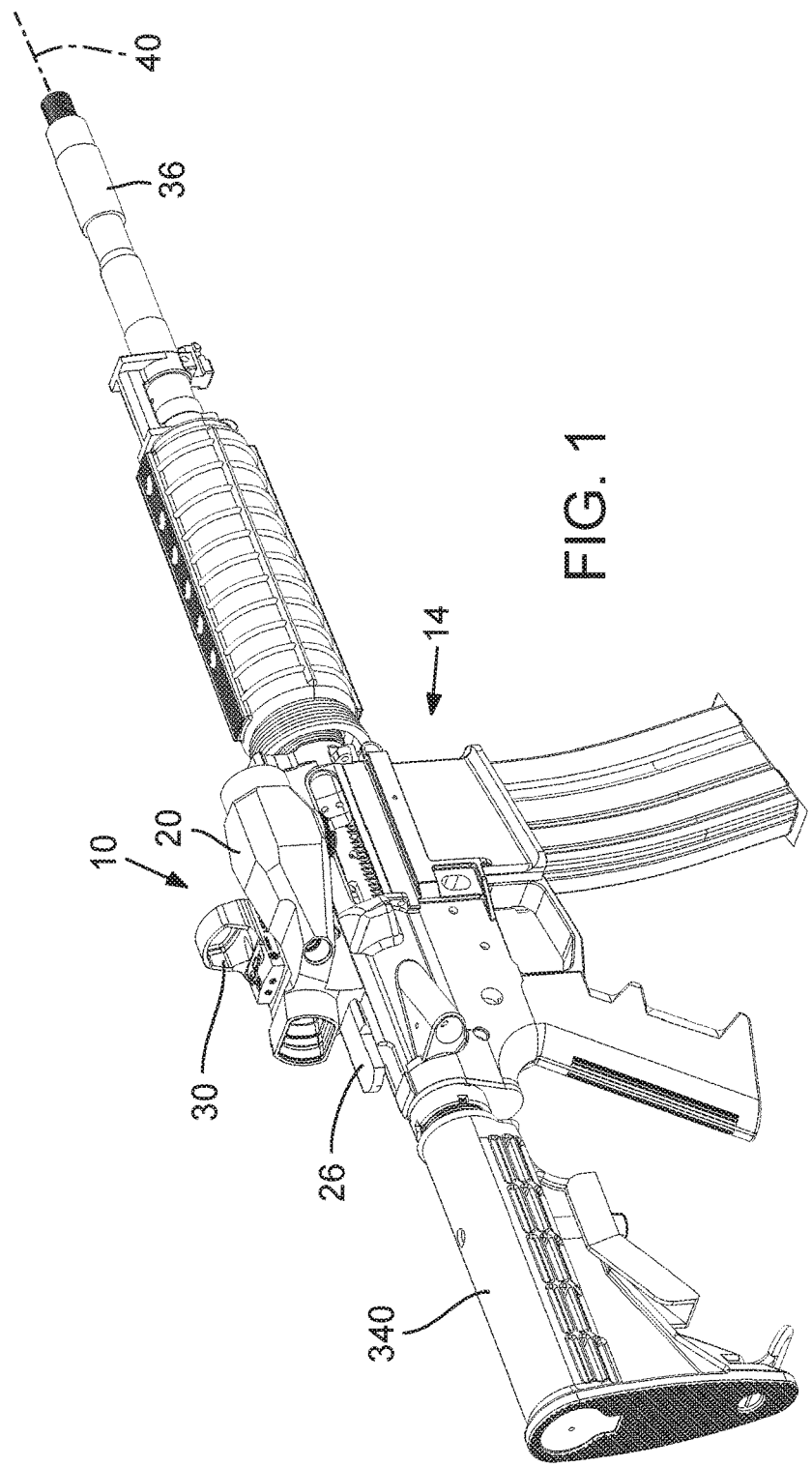
FIG. 1 is a rear right side isometric view of an optical aiming system including a telescopic sight shown mounted to a rifle and a reflex sight mounted atop the telescopic sight, according to a first embodiment.
Figure 2:
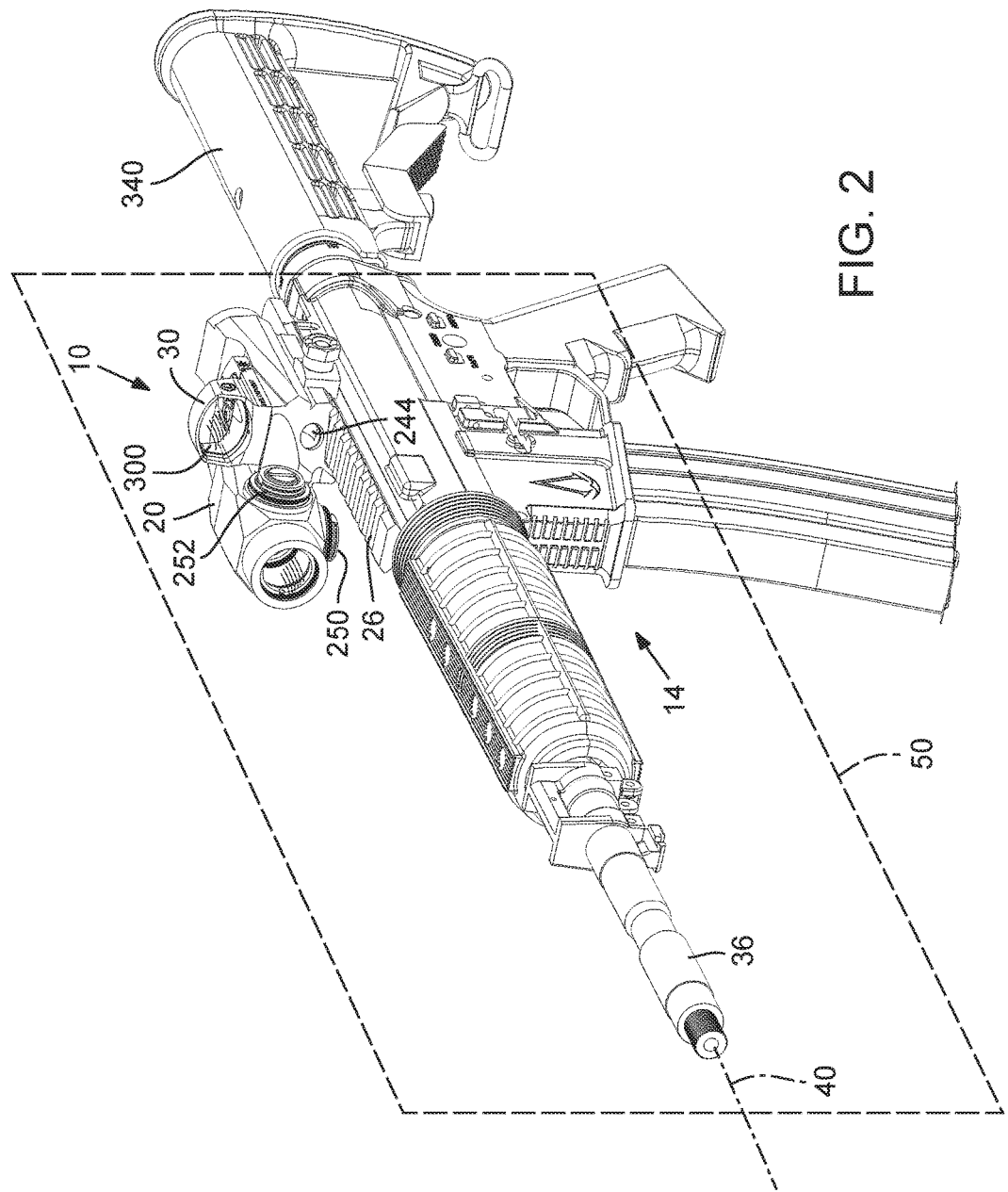
FIG. 2 is a front left side isometric view of the aiming system and rifle of FIG. 1.

FIGS. 1 and 2 illustrate an optical aiming system 10 according to a first embodiment, shown mounted to a rifle 14. Aiming system 10 includes a telescopic sight 20 mounted to a mounting rail 26 of rifle 14, which may comprise a Picatinny rail (also known as a MIL-STD-1913 rail), which is a universal dovetail-shaped mounting rail commonly found on AR-15 rifles and other tactical rifles. In the embodiment illustrated in FIGS. 1 and 2, a non-magnifying reflex sight 30 is mounted atop telescopic sight 20. Telescopic sight 20 and non-magnifying sight are mounted in alignment with a bore of a barrel 36 of rifle 14, defining a line of initial trajectory 40 of rifle 14. Line of initial trajectory 40 lies within a vertical plane 50 (FIG. 2) that also longitudinally bisects mounting rail 26. As further described below with reference to FIGS. 3 and 4, an objective 160 of telescopic sight 20 is laterally offset (i.e. horizontally offset) relative to vertical plane 50.

It should be understood that the term "vertical plane" is used herein merely as convenient terminology for a frame of reference, and not to limit plane 50 to being exactly vertical relative to the horizon or gravity (i.e. plumb), even though when a rifle is in use the line of initial trajectory 40 and mounting rail 26 will desirably be arranged in a vertically stacked relationship as illustrated and described. As is known in the art, rifle 14 and aiming system 10 can be canted to the side together, thereby tilting vertical plane 50, albeit potentially impacting bullet drop compensation and parallax compensation functions of a reticle 190, 700 (FIGS. 4 and 13) of aiming system 10 described below. Also, aiming system 10 may be mounted on a side rail (not shown) or other non-standard mount that is not perfectly centered or horizontal relative to a normal shooting position. Moreover while the position of mounting rail 26 relative to vertical plane 50 is a common attribute of a tactical rifle, it should be understood that mounting rail 26 or other mounting features or surfaces of a projectile weapon may not necessarily be centered on vertical plane 50. Thus, unless expressly stated in the claims, the use of the term "vertical plane" is not alone intended to limit the scope of the invention to an arrangement in which a mounting rail or other mounting features have the same shape or position as mounting rail 26 to the projectile weapon or to vertical plane 50, or to an exact placement of the vertical plane relative to mounting rail 26. As discussed below, the position of vertical plane 50 is determined in part by the line of initial trajectory 40 of the projectile weapon and in part by the location of an eye point 280 (FIGS. 4 and 5) of the telescopic sight 20.

FIG. 3 is an isometric view of telescopic sight 20 of aiming system 10, with reflex sight 30 removed, and FIG. 4 is an isometric view of an optical system 100 of telescopic sight. With reference to FIGS. 3 and 4, telescopic sight 20 includes a housing 110 that supports optical system 100 relative to a mounting surface 120 of housing 110. In the embodiment shown, mounting surface 120 comprises surfaces of a mounting clamp 124 (FIG. 7) having a longitudinal dovetail shaped slot 128. A fixed portion 132 of clamp 124 includes longitudinal reference surfaces providing primary lateral aiming alignment of telescopic sight 20 relative to mounting rail 26. Preferably, these reference surfaces and the entirety of fixed portion 132 are integrally formed directly in housing 110, by machining from stock material or otherwise. A movable portion of clamp 124 is formed by a clamp shoe 134 illustrated in FIG. 7, which is retained to fixed portion 132 by coupling bolt 136. In other embodiments, mounting surface 120 may take other shapes and forms providing a solid platform or reference that, with mounting rail 26 or other scope mount, precisely aligns telescopic sight 20 and optical system 100 relative to rifle 14 when telescopic sight 20 is mounted thereon. For example, in a conventional riflescope housing, the outer longitudinal surface of a main tube of the scope serves as the mounting surface, which is engaged by mounting rings that are secured to a mounting base on the gun's receiver. The term mounting surface may also encompass multiple surfaces on housing 110 that may or may not lie in a common plane, but achieve alignment of telescopic sight 20 using other mounting devices.

With reference to FIG. 3, an eyepiece 150 of optical system 100 is supported by housing 110 at a rearward opening in eyepiece end 152 thereof. When telescopic sight 20 is mounted on rifle 14, eyepiece 150 is aligned with vertical plane 50 (FIG. 2), such that an optical axis of eyepiece 150 is contained in vertical plane 50. In some other embodiments, such as those illustrated in FIGS. 8-10 discussed below, the optical axis of eyepiece 150 is not contained in vertical plane 50 but intersects vertical plane 50. Housing 110 also includes an auxiliary sight mounting platform 154 including a set of threaded mounting holes 156 formed on a top outer surface of housing 110 forward of eyepiece 150. Auxiliary sight mounting platform 154 is horizontal and is centered on and intersects vertical plane 50 when telescopic sight 20 is mounted on rifle 14. Auxiliary sight mounting platform 154 is preferably recessed horizontally below a top surface 158 of eyepiece end 152 of housing 110 (facing away from line of initial trajectory 40) and below an uppermost edge 159 (FIG. 4) of eyepiece 150 to position a miniature reflex sight or other non-magnifying sight or auxiliary sighting device at a desired or optimal height, as further explained below. Top surface 158 of eyepiece end 152 may be flat, following the contour of an uppermost edge 159 of eyepiece 150 in which a top segment of round eyepiece lenses is removed to provide a clear line of sight for use of reflex sight 30, as further described below with reference to FIG. 5.

Figure 5:
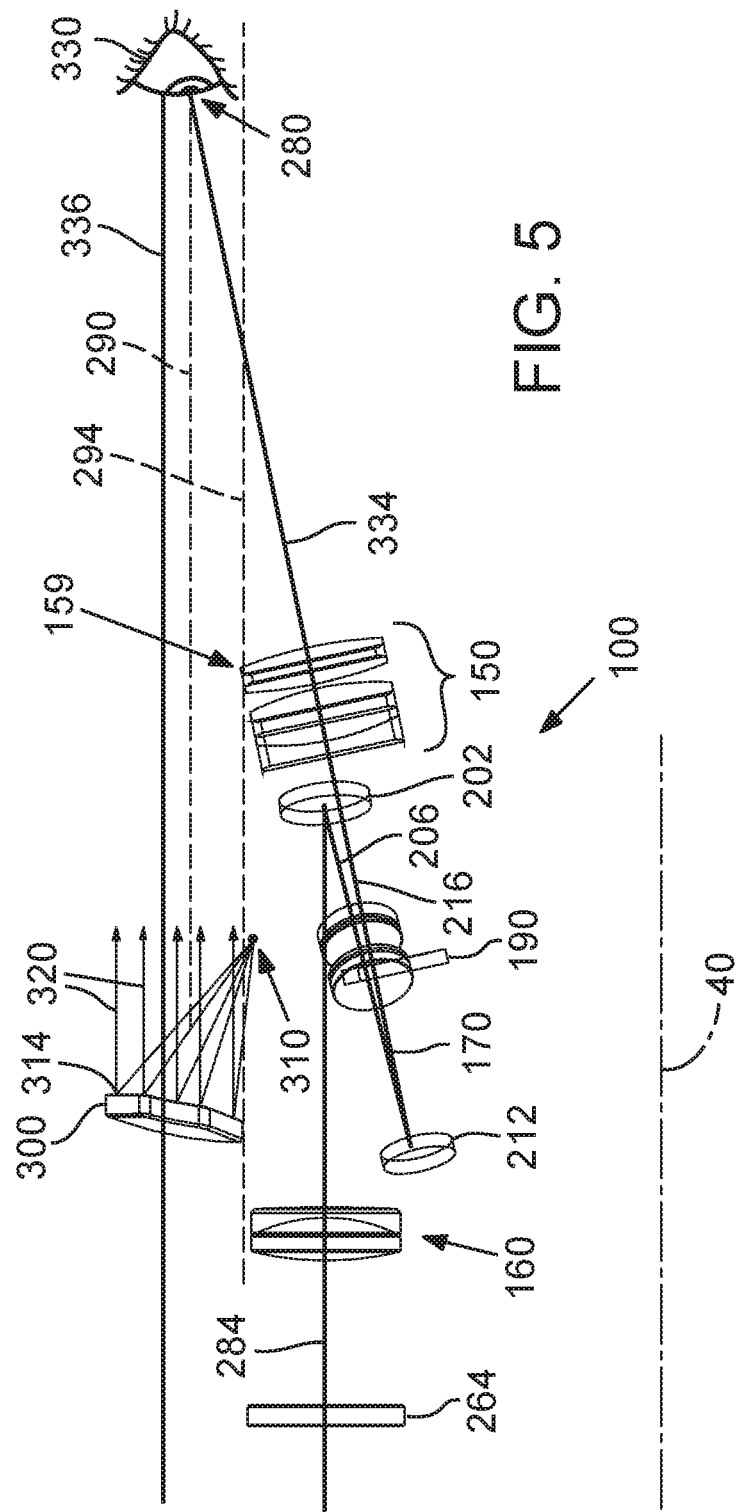
FIG. 5 is a left side elevation view of the optical system of the aiming system of FIGS. 1 and 2 illustrating the optical path of the telescopic sight and lines of sight from an eye point.

Continuing with reference to FIGS. 3 and 4, optical system 100 includes an objective 160 comprising objective lenses 164, which gather and focus light at a first (front) focal plane (FFP, not illustrated). In another embodiment (not shown), objective 160 may comprise a reflector or other suitable objective system. Objective 160 is offset horizontally relative to an eyepiece 150 of optical system 100 in the embodiment illustrated. A folded optical path 170 of optical system 100 extends from objective 160 to eyepiece 150. The folded aspect of optical path 170 is created by a light redirection device 180 that receives light from objective 160 and causes an image of the field of view formed at a rear focal plane (RFP) (located approximately at the plane of an aiming reticle 190 of optical system 100) to be offset horizontally from objective 160. In particular, in the embodiment illustrated, light redirection device 180 includes a first reflective surface consisting of a first mirror 202 that receives light from the objective 160 and reflects it forwardly along a first path fold segment 206 toward a second reflective surface consisting of a second mirror 212. The first path fold segment 206 may be angled downwardly relative to an optical axis of objective 160 (wherein the optical axis of objective 160 is coincident with a segment of optical path 170 between objective 160 and first mirror 202), depending on the desired or required geometry of optical system 100. Second mirror 212 receives light reflected by first mirror 202 and reflects the light rearward along a second path fold segment 216 that is angled upwardly away from the line of initial trajectory 40 to eyepiece 150, as best shown in FIG. 5. The light propagating along second path fold segment 216 forms, at the RFP, an image of the field of view of telescopic sight 20. An erector system 230 including an image-erecting relay lens unit 234 positioned between objective 160 and eyepiece 150 erects an image of the field of view formed at FFP and focuses it at RFP. In the figures, backing caps supporting the mirrors 202, 212 are omitted, providing a view through openings 242, 244 (FIGS. 3 and 2, respectively) in housing 110 through which mirrors 202, 212 are installed.

In another embodiment (not illustrated), erector system 230 may include a power-varying relay lens system (zoom lens system) interposed between FFP and RFP and including at least one (and typically at least two or more) lens elements selectively movable along the optical path 170 to vary an optical magnification setting of telescopic sight 20. When a zoom lens system is utilized, the aiming reticle 190 is preferably located at front focal plane FFP to maintain a constant relationship between markings on reticle 190 and the target scene regardless of the magnification setting of the zoom lens system.

Although light redirection device 180 is illustrated as a pair of mirrors 202, 212, in other embodiments (not shown) light redirection device may comprise a prism including first and second reflective surfaces. A prism system may be an image-erecting prism system, in which case relay lens system 234 can be omitted, and image-carrying light from objective 160 may be first focused at the plane of reticle 190. In yet another embodiment, light direction device 180 includes an image sensor and an electronic image display device (not illustrated). In the case of an electronic image sensor and display combination, the image sensor would be located at a focal plane, namely either the focal plane of objective 160 (FFP) or a focal plane of the erector system 230, and the display would be located either at the focal plane of eyepiece 150 (rear focal plane RFP), or at the front conjugate of erector system 230. Alternatively, light redirection device 180 might include a type of light guide, such as a light pipe (e.g. a bundle of fine aligned optical fibers forming an image pipe), which may bend the optical path without folding it longitudinally.

One or more of objective lenses 164 are slidably supported on housing 110 for movement transversely of an optical axis of the objective lenses relative to other elements of optical system 100. In the embodiment illustrated, the lateral position of both objective lenses 164 is adjustable via elevation and windage adjustment screws 250, 252 (FIG. 3) that are supported on and extend through housing 110. In alternative embodiments, another kind of adjustment mechanism may be employed. Adjustment screws 250, 252 can be manually turned to drive objective lenses 164 in a direction transversely of (and preferably perpendicular to) their optical axis to thereby effect vertical and horizontal aiming adjustments to the line of sight of telescopic sight 20, for sighting-in the aim point of telescopic sight 20 or compensating for bullet drop and/or wind effects, as further described in U.S. Pat. No. 7,827,723 of Zaderey et al., issued Nov. 9, 2010. Because objective lenses 164 are movable, they are not sealed to the housing 110. Instead, a transparent sealing window 264 (illustrated in FIG. 4) is fixed to housing 110 forward of objective lenses 164 and hermetically seals an interior of housing 110. The horizontal offset of objective 160 relative to vertical plane 50 and mounting rail 26 enables elevation adjustment screw 250 to be positioned on an underside of housing 110 while remaining accessible for adjustment via a coin or screwdriver, which further enhances the low profile nature of telescopic sight 20 and avoids elevation adjustment screw 250 inhibiting the unaided (naked eye) field of view past housing 110.

A left side elevation view of optical system 100 is illustrated in FIG. 5 together with optical elements of reflex sight 30. With reference to FIGS. 4 and 5, eyepiece 150 is positioned rearward of rear focal plane RFP (coplanar with reticle 190) and defines an eye point 280 spaced rearwardly of eyepiece 150 at which the image of the field of view formed at RFP is visible through eyepiece 150. First path fold segment 206 is angled downwardly toward second mirror 212 relative to an optical axis 284 of objective 160. Second mirror 212 receives the light reflected by first mirror 202 and reflects the light rearward along second path fold segment 216, which is angled upwardly away from initial line of trajectory 40 and toward a horizontal plane containing the optical axis 284 of objective 160. This down and up folded optical path 170 assists in lowering the position of eyepiece 150 relative to the weapon. In the embodiment illustrated, optical path 170 is folded in both the horizontal and vertical axes, though in other embodiments (not illustrated), optical path 170 may be folded only horizontally or in only a vertical plane 50.

When telescopic sight 20 is mounted to rifle 14, eye point 280 is located at a place on vertical plane 50 (FIG. 2) such that a line 290 (FIG. 5) parallel to the line of initial trajectory 40 and intersecting eye point 280 does not intersect eyepiece 150. In the embodiment illustrated in FIGS. 1-7, eyepiece 150 is truncated and flat along its uppermost edge 159 (i.e., a round lens that has been cut, ground, or otherwise truncated or relieved to remove a section) to allow a clear horizontal line of sight from eye point 280 through a viewing window 300 of reflex sight 30 mounted forwardly of eyepiece 150. The truncated uppermost edge 159 of eyepiece may also enable a relatively large range of eye positions for use of reflex sight (beyond eye point 280), which may facilitate fast target acquisition in close-quarter tactical situations. Eye point 280 is preferably located just above a horizontal plane 294 tangent to uppermost edge 159 of eyepiece 150, which faces away from line of initial trajectory 40 when telescopic sight 20 is mounted to rifle 14 or another projectile weapon. Skilled persons will appreciate that eye point 280 may be any point within an exit pupil of telescopic sight 20 at which a viewer's eye 330 may be located to view the entire image of the field of view of telescopic sight 20.

Reflex sight 30 includes a light source 310, such as an LED, which is positioned near a focal point of viewing window 300, which is curved and includes a partial reflector in the form of a dichroic reflective surface 314. The dichroic reflective surface 314 of viewing window 300 selectively reflects the wavelength of illumination emitted by light source 310 while passing other wavelengths of light, so as to reflect collimated light 320 toward the viewer's eye 330 while allowing the viewer to see a distant target scene through viewing window 300. As is well known in the art, this arrangement results in an image of an aiming mark or reticle formed by light source 310 to appear focused at a distance forward of reflex sight 30 and superimposed on the target scene viewed through viewing window 300 to enable accurate aiming across a relatively wide range of head and eye positions at which the collimated light is received by the viewer's eye 330.

Viewing window 300 is positioned predominantly above the horizontal plane 294 when both reflex sight 30 and telescopic sight 20 are mounted to rifle 14, such that both telescopic sight 20 and reflex sight 30 can be used to aim rifle 14 with essentially no movement of the viewer's head. In practice, a small portion of the base of viewing window 300 may lie below horizontal plane 294, which will only slightly reduce the effective range of eye positions at which reflex sight 30 can be used for aiming. The shooter or viewer may easily change between a (magnified) viewing line of sight 334 of telescopic sight 20 and a non-magnified viewing line of sight 336 through reflex sight 30 merely by rotating the viewer's eye 330 within its socket and with essentially no head movement. Thus, in practice when switching between sights 20 and 30, the eye point 280 of telescopic sight 20 (along viewing line of sight 334) may be slightly below and spaced apart from an eye point of viewer's eye 330 when viewing through reflex sight along viewing line of sight 336. Alternatively, both sights 20, 30 may be viewed from coincident eye points. When the telescopic sight 20 and reflex sight 30 are mounted to mounting rail 26 of rifle 14, a centroid of the surface area of viewing window 300 is preferably located between 1.3 and 1.75 inches above mounting rail 26, and more preferably between 1.3 and 1.6 inches or between 1.4 and 1.5 inches above mounting rail 26, which is an ideal height for allowing a shooter to form a cheek weld with a stock 340 (FIG. 1) of rifle 14. Thus, telescopic sight 20 and reflex sight 30 may be sequentially used for aiming without breaking the cheek weld.

Figure 6:
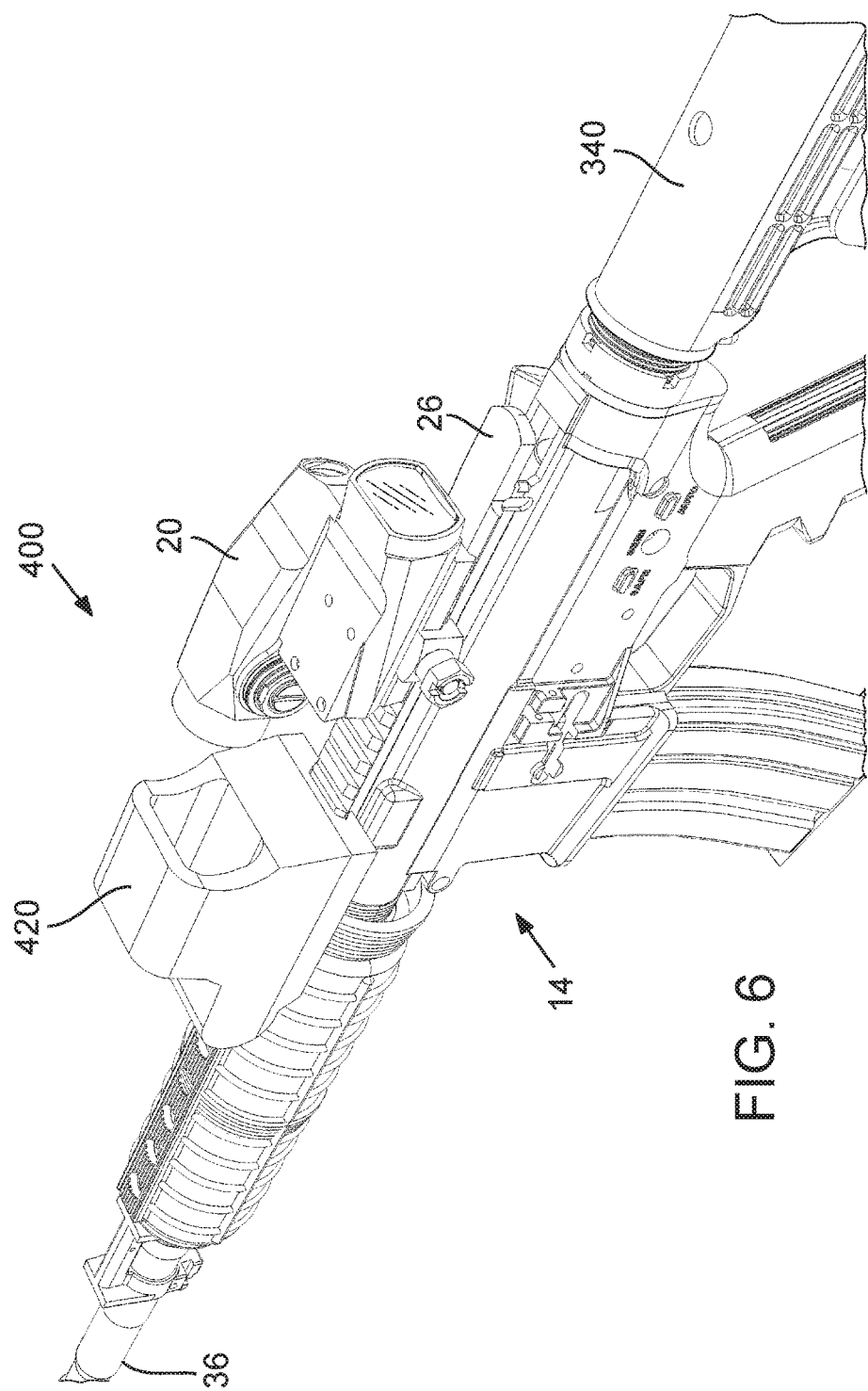
FIG. 6 is an isometric view of an optical aiming system including the telescopic sight of FIG. 4 and a holographic sight mounted to a common mounting rail of a rifle, according to another embodiment.

FIG. 6 illustrates an aiming system 400 according to another embodiment, in which a non-magnifying holographic weapon sight 420 and telescopic sight 20 are independently mounted to mounting rail 26 of rifle 14 in tandem. Holographic weapon sight may be any of a variety of holographic sights sold by EOTech, a subsidiary of L-3 Communications located in Ann Arbor, Mich. In the tandem mounting arrangement, each of telescopic sight 20 and holographic weapon sight 420 is separately removable and mountable to the common mounting rail 26 independently of the other. In this arrangement, the sights are independently sighted in. The sights can be targeted at different sighted-in ranges. Or if a common sighted-in range is desired, the second one of the sights to be mounted can be sighted in merely by positioning its aiming mark at the same place on the target scene as the other sight, which has been previously sighted-in.

Figure 7:
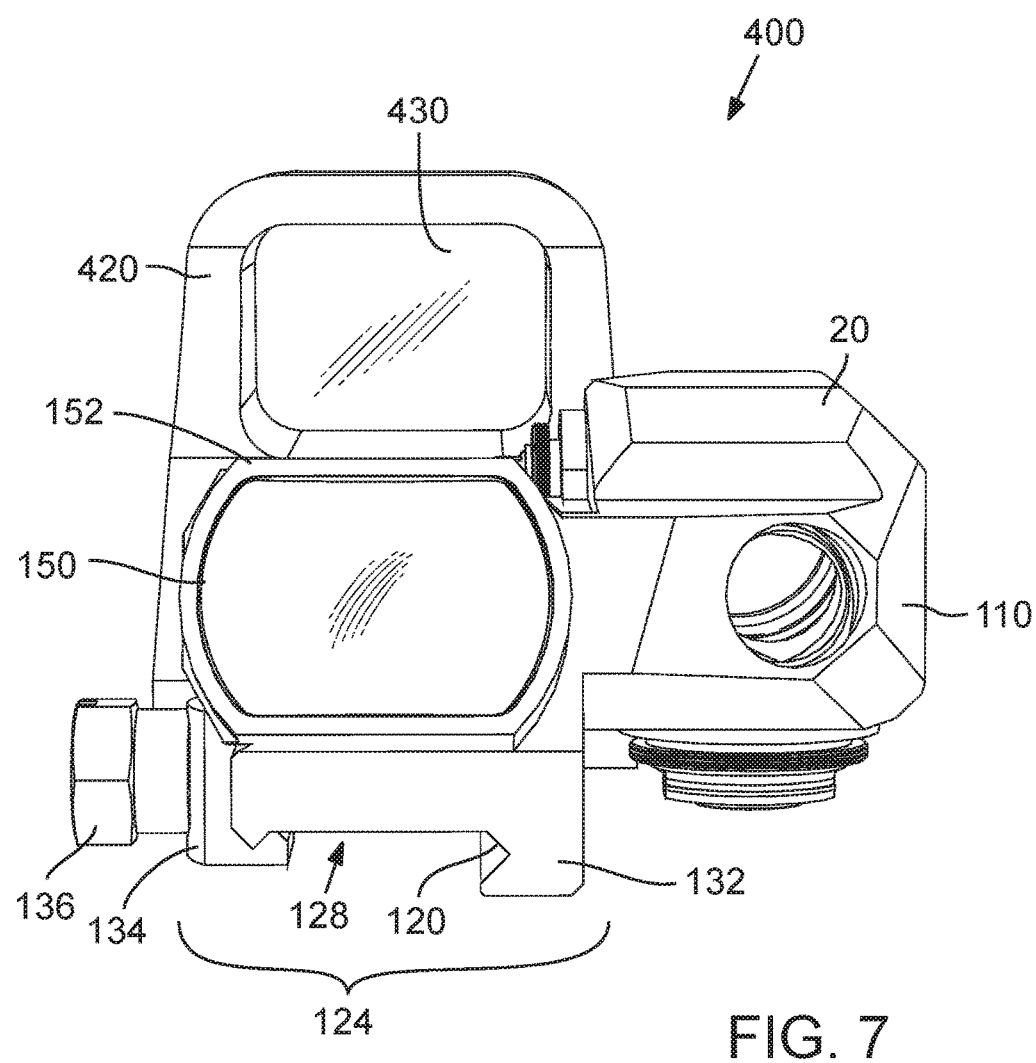
FIG. 7 is a rear perspective view of the optical aiming system of FIG. 6 with the rifle omitted.

FIG. 7 is a rear perspective view of aiming system 400 illustrating how a viewing window (optic 430) is in a vertically stacked relationship with eyepiece 150. In practice, the fields of view of telescopic sight 20 and the non-magnifying sight (either holographic weapon sight 420, or in the embodiment of FIGS. 1-7, reflex sight 30) may be stacked directly adjacent each other to form a composite image in which the top portion of the composite image is a wide-field of view of the scene with no magnification and the bottom portion of the composite image is a narrow field of view of a magnified image of the same scene of the distant target. In some embodiments, the two images may be slightly spaced apart or divided by an edge of eyepiece end 152 of housing 110 to provide a distinct separation between images and avoid confusion.

Other types of non-magnifying sights may also be utilized with telescopic sights according to the present disclosure. For example, reflex sights having a collimated light source and a flat partially reflective viewing window may be utilized. Still other non-magnifying sights, such as iron sights, may be usable with telescopic sights and aiming systems (including a secondary reflex sight or other non-magnifying sight). Mounting a non-magnifying sight, such as reflex sight 30 or holographic weapon sight 420, at a normal mounting height in the range of 1.3 to 1.75 inches enables the user to co-witness the non-magnifying sight with conventional iron sights (not illustrated), which may include a front iron sight located forward of aiming system 10 toward a muzzle end of barrel 36, and a rear iron sight located behind the front iron sight and behind or forward of aiming system 10.

Skilled persons will appreciate that the aiming systems 10 and 400 of FIGS. 1-7 are right-handed and designed to be viewed using the shooter's right eye, and their configuration provides a right-handed shooter with little impediment to viewing the target scene with a naked left eye. However, if the same aiming systems 10 and 400 were to be used by a left-handed shooter, the objective 160 and the portion of housing 110 associated therewith would tend to block the unaided field of view of the shooter's right eye. A left-handed embodiment of the aiming systems (not shown) is also contemplated, in which the objective 160 is horizontally offset to the left of the vertical plane 50.

Figure 8:
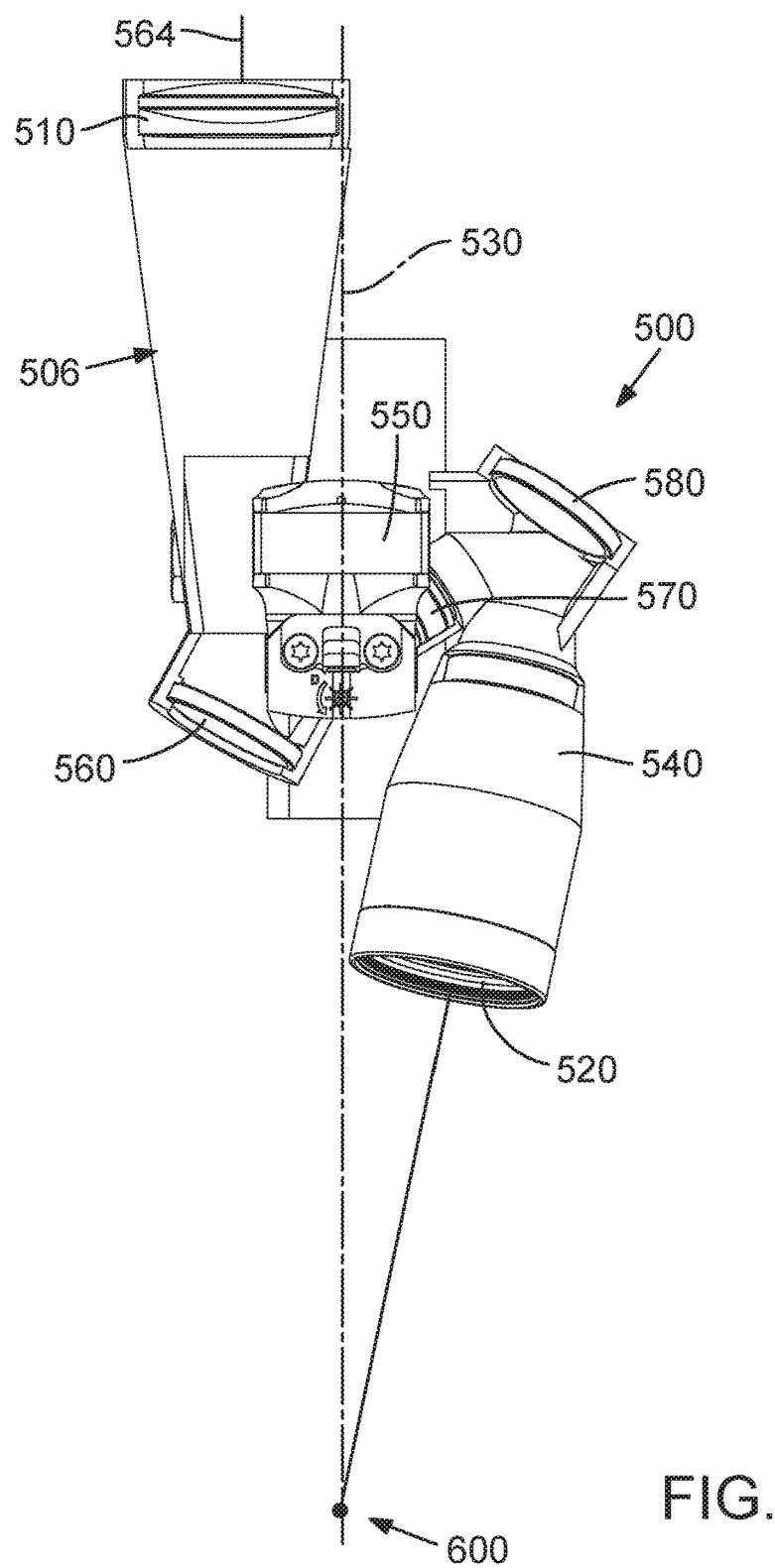
FIGS. 8, 9 and 10 are respective top plan, right side elevation, and eyepiece end views of an optical aiming system according to yet another embodiment.
Figure 9:
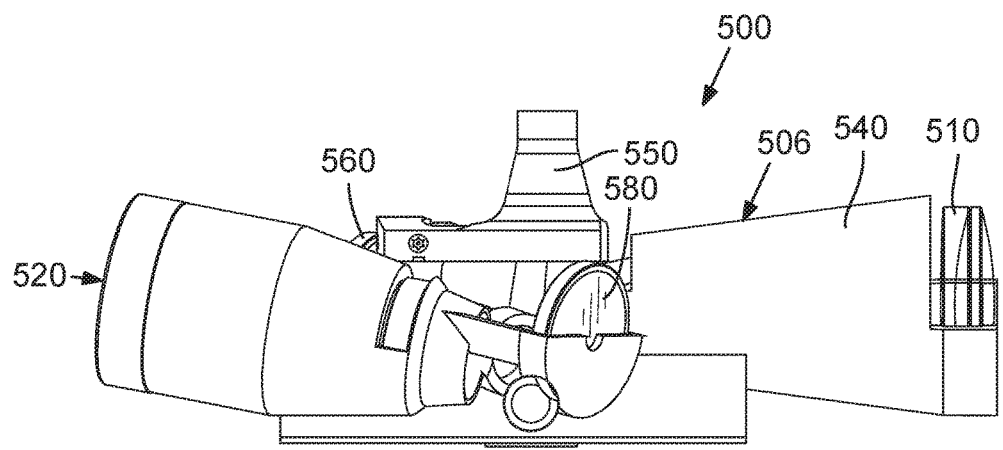
Figure 10:
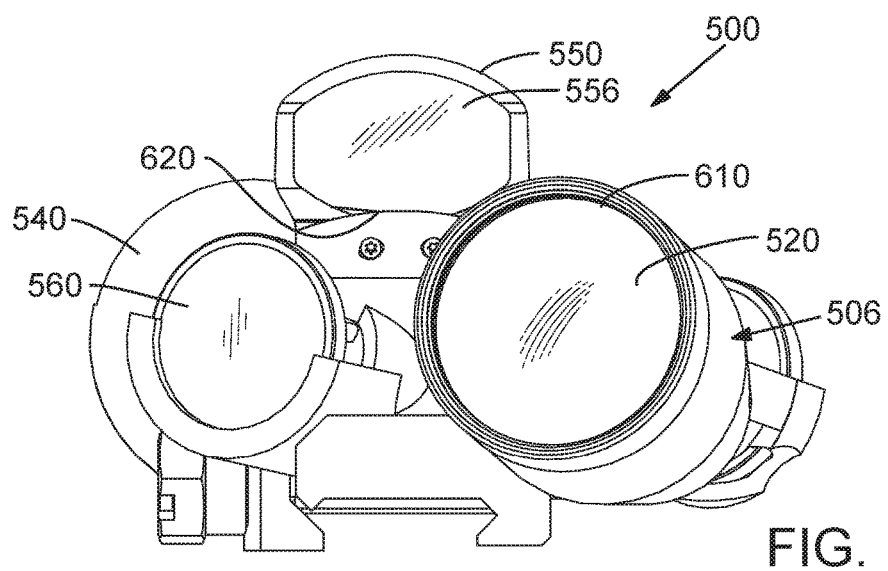

FIGS. 8, 9 and 10 show respective top, right side, and eyepiece end views of an aiming system 500 according to yet another embodiment, including a telescopic sight 506 having an objective 510 offset laterally to the left of a vertical plane (illustrated by centerline 530 in FIG. 8) and an eyepiece 520 offset laterally to the right of vertical plane 530. Portions of a housing 540 of telescopic sight 506 are cut away to reveal portions of an optical system 508 of telescopic sight 506. FIG. 11 is a top view of optical system 508 of telescopic sight, and FIG. 12 is a side elevation view of optical system 508. FIG. 12 also illustrates a viewing window 556 of a reflex sight 550 of aiming system 500.

With reference to FIGS. 8-12, reflex sight 550 is mounted along a central portion of the housing 540 of telescopic sight 506 between objective 510 and eyepiece 520. A first mirror 560 receives light from objective 510 and reflects it forwardly and across vertical plane 530 and at a slight downward angle relative to the optical axis 564 of objective 510 through an image-erecting reflex lens unit 570 to a second mirror 580. Second mirror 580 reflects the light rearward and toward vertical plane 530 to a rear focal plane (RFP) located at or near a reticle 590 (FIGS. 11 and 12). Eyepiece 520 defines an eye point 600 rearward of eyepiece 520 at which the image at the RFP is visible. The eye point 600 is located at a place on vertical plane 530 such that a line parallel to the initial line of trajectory (not illustrated) extends through viewing window 556 of reflex sight and does not intersect eyepiece 520. Due to the lateral offset of eyepiece 520, eye point 600 may, in some embodiments, be lower than a horizontal plane (not illustrated) tangent to an uppermost edge 610 (FIG. 12) of eyepiece 520, yet a horizontal line of sight intersecting eye point 600 and contained in vertical plane 530 does not intersect eyepiece 520. A similar lateral arrangement of eyepiece 520 may also enable reflex sight 550 to be mounted relatively low on telescopic sight 506 such that a lower edge 620 (FIG. 12) of viewing window 556 is vertically lower than the uppermost edge 610 of eyepiece 520 without occluding an effective field of view through viewing window 556, as best illustrated in FIG. 10.

In still other embodiments (not illustrated) a telescopic sight with a folded optical path may include a small diameter objective centered on the weapon (on vertical plane 530); and with an eyepiece that is laterally offset to the side of vertical plane 530, similarly to telescopic sight 506 of FIGS. 8-12. A small diameter objective may allow reflex sight to be mounted atop the telescopic sight while maintaining a height of a centroid of the viewing window of reflex sight at a height of between 1.3 and 1.75 inches above the mounting rail (not shown). Like the embodiment of FIGS. 8-12, the eyepiece is angled inwardly and upwardly to provide an eye point that allows both the telescopic sight and the reflex sight mounted thereon to be viewed from essentially the same head position and with little eye movement, and to provide other benefits described above with respect to FIGS. 8-12 while avoiding the parallax issues addressed by the reticle described below.

Figure 13:
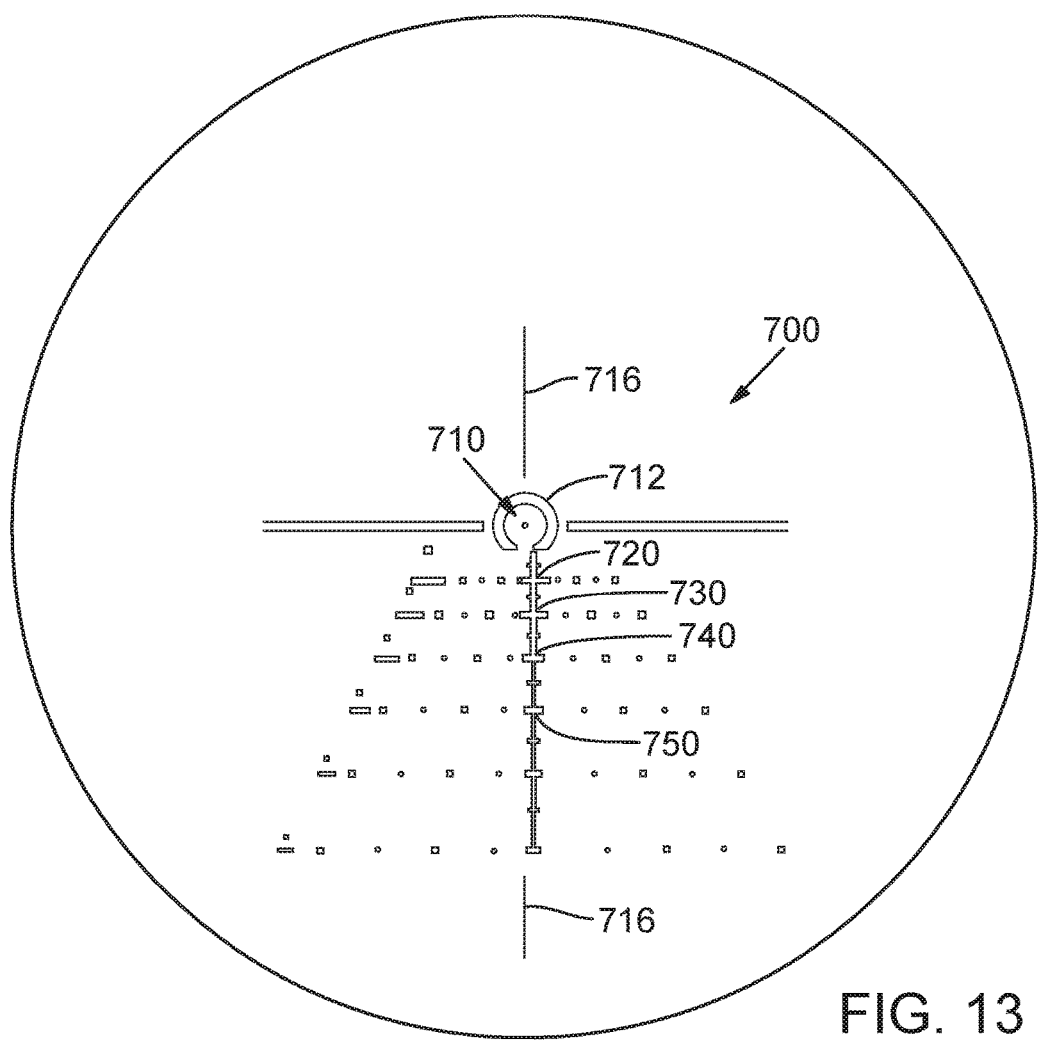
FIG. 13 is a view of a reticle of the telescopic sight of FIGS. 1-7.

FIG. 13 is a view of a reticle 700 usable in place of reticle 190 of telescopic sight 20 (FIGS. 4 and 5). With reference to FIG. 13, reticle 700 includes a primary aiming mark 710 at the center of a horseshoe shape 712. A vertical aiming axis (shown partially by dimension line 716, which forms no part of reticle 700) extends through aiming mark 710. Reticle 700 is designed so that, when telescopic sight 20 is sighted-in with primary aiming mark 710 accurately aiming at a point of impact of the projectile at the sighted-in distance (for example 100 or 200 yards), holdover aiming marks 720, 730, 740, 750 provide compensation for different ranges (e.g. 300, 400, 500, and 600 yards, etc.). Holdover aiming marks 720, 730, 740, and 750 are spaced below primary aiming mark 710 and laterally offset to the right side of vertical aiming axis to compensate for parallax induced by the horizontal offset of the objective 160 to the right of vertical plane 50 and line of initial trajectory 40 and an angled line of sight. More particularly, the position of reticle 700 in telescopic sight 20 (and particularly aiming marks 710, 720, 730, 740, and 750) cooperates with objective 160 to define a line of sight from objective 160 that is angled horizontally inward toward vertical plane 50 when telescopic sight 20 is mounted to rifle 14. Skilled persons will appreciate that this angled line of sight induces left-to-right parallax error at ranges different from the sighted-in range, compensated by laterally offsetting holdover aiming marks 720, 730, 740, 750 relative to vertical axis 716 of reticle 700, as discussed above. The position of holdover aiming marks 720, 730, 740, 750 may also be designed to compensate for spin-drift of the bullet at ranges beyond the sighted-in range.

Figure 14:
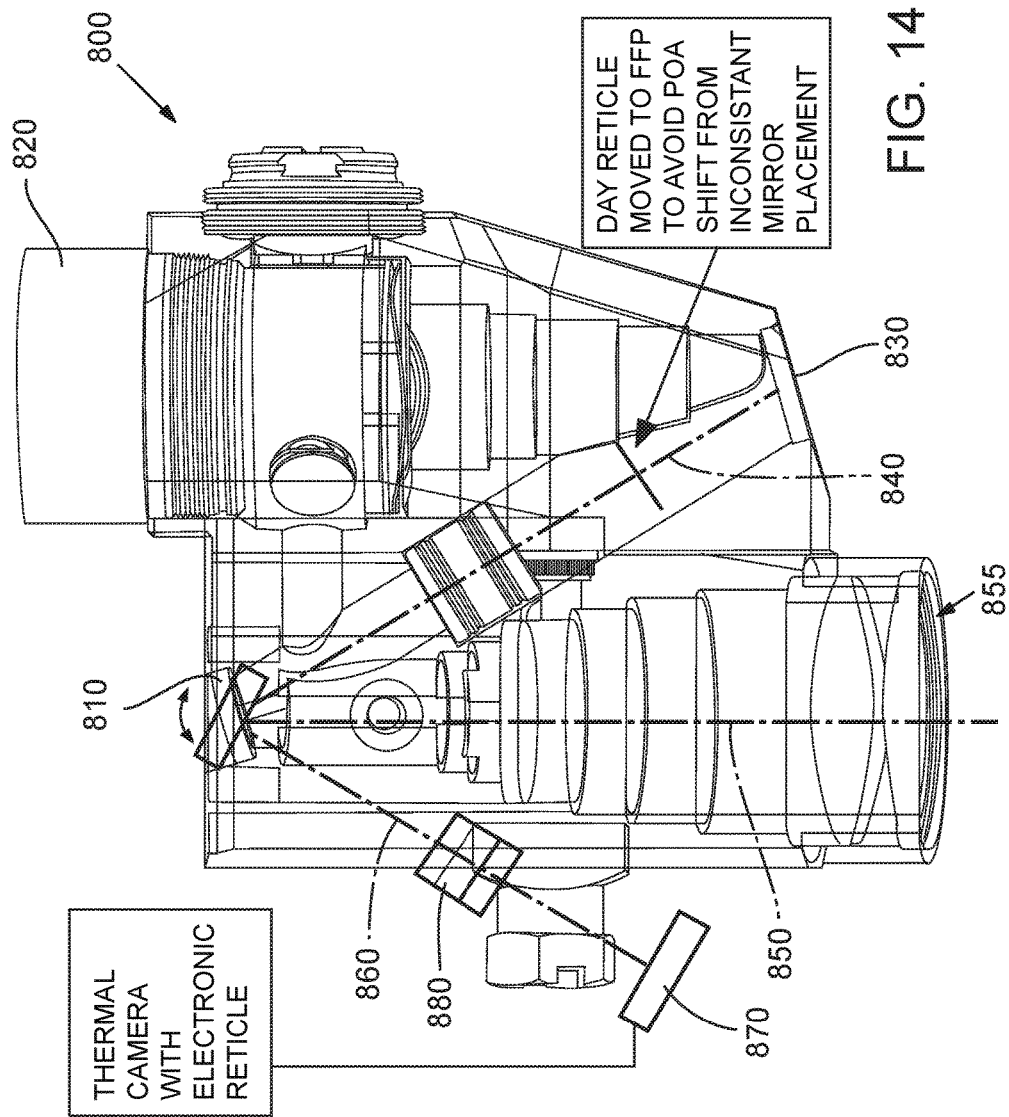
FIG. 14 is a top view of a telescopic sight with a pivoting mirror for switching the optical path to an auxiliary display.

FIG. 14 is a top view of a telescopic day/night sight 800 similar to telescopic sight of FIGS. 1-7, but in which a second mirror 810 is pivotable to switch the field of view of telescopic sight 800 between a day mode and a night mode. In day mode, the second mirror 810 is in a first position to receive visible light (which has been gathered by objective 820 and reflected by first mirror 830 along a first path fold segment 840) and to reflect the visible light along a second path fold segment 850 to a rear focal plane (RFP) for viewing via the common eyepiece 855. In night mode, the second mirror 810 is pivoted or otherwise moved to a second position, to receive light along a third optical path segment 860 from a display unit 870 of an auxiliary viewing device, such as a thermal imaging device, infrared scope, or other night vision sight, or from another type of video or image input device. In night mode, the image of the display is formed at RFP for viewing via eyepiece 855. A relay lens unit 880 (erector lenses) is provided in third optical path segment 860 between display unit 870 and second mirror 810. In some embodiments, telescopic day/night sight 800 may be additionally utilized with a reflex sight or other non-magnifying sight (not illustrated).

FIGS. 15 and 16 illustrate another embodiment of an optical aiming system 1000 that is mountable to a rifle or other weapon in the same or similar fashion as the optical aiming system 10 illustrated. The optical aiming system 1000 includes a light redirection device 1100 positioned rearward of the eyepiece 1060 to offset the eye point 1110 and allow the shooter to view the target through the riflescope while also allowing the shooter to see around, above, or below the riflescope for an unobstructed view of the target. Additional details of the optical aiming system 1000 are described below with reference to FIGS. 15 and 16. To avoid repetition, certain components of the optical aiming system 1000, such as a reticle, an erector assembly, and/or additional lenses, may not be shown or described in detail to avoid obscuring more pertinent details of the embodiment. One having ordinary skill in the art would understand that such details (and others) described in previous embodiments illustrated in FIGS. 1-14 may be combined with the specific details of the embodiment in FIGS. 15 and 16.

With collective reference to FIGS. 15 and 16, the optical aiming system 1000 includes a telescopic sight 1010 and a non-magnifying sight 1020 (such as a reflex sight) positioned above the telescopic sight 1010. As mentioned previously and further discussed below, the telescopic sight 1010 and the non-magnifying sight 1020 may share a common housing 1080 in some embodiments (as illustrated in FIGS. 15 and 16), or may be independently mountable to the rifle as separate components (as shown in FIG. 1). In a similar fashion as described in FIG. 1, the telescopic sight 1010 and non-magnifying sight 1020 are mounted via a mount 1040 in alignment with a bore of a barrel of rifle, defining a line of initial trajectory 1030 of the rifle. As is further described below, the aiming system 1000 may facilitate concurrent use of the non-magnifying sight 1020 at a normal mounting height and the telescopic sight 1010, thereby allowing the viewer to change views between the telescopic sight 1010 and the non-magnifying sight 1020 with little eye movement and essentially no head movement.

The telescopic sight 1010 includes a housing 1080 that supports optical aiming system 1000 relative to a mounting surface of the rifle. The optical aiming system 1000 includes an objective 1050 comprising objective lenses 1052, which gather and focus light at a first (front) focal plane (FFP, not illustrated). In another embodiment (not shown), objective 1050 may comprise a reflector or other suitable objective system. The optical aiming system 1000 further includes an eyepiece 1060 supported by the housing 1080 at a rearward opening toward a viewing end 1070 of the housing 1080. When the telescopic sight 1010 is mounted to the rifle, the eyepiece 1060 and the objective 1050 are substantially aligned along an optical axis 1090.

The optical aiming system 1000 further includes a light redirection device 1100 positioned rearward of the eyepiece 1060 along the optical axis 1090. In some embodiments, the light redirection device 1100 may be a wedge prism that deflects or refracts the light received from the objective (i.e., an image of the target) at a fixed angle. In some embodiments, the fixed angle of the wedge prism 1100 may range between 4-8 degrees, depending on the dimensions of the optical component and riflescope. In other embodiments, a six-degree wedge prism 1100 may be used to provide sufficient offset and allow the shooter to see over all optical components of the telescopic sight 1010 and through non-magnifying sight 1020. Preferably, the wedge prism 1110 is positioned in as close relation to the eyepiece 1060 as possible, offsetting the eye point 1110 far enough for the shooter to see around, above, or below the riflescope 1000 for an unobstructed view of the target.

With particular reference to FIG. 15, the wedge prism 1100 refracts the image of the target, as acquired through the telescopic sight 1010, rearwardly and upwardly toward an eye point 1110 spaced apart rearwardly from the prism 1100. During use, a viewer may view an image of the distant target at the eye point 1110 when the telescopic sight 1010 is mounted to the projectile weapon. As shown in FIG. 15, the eye point 1110 may be located at a place on a plane vertically offset from the optical axis 1090 such that a line intersecting the eye point 1110 does not intersect the eyepiece 1060, the objective 1050, or any other optical component of the telescopic sight 1010.

With reference to FIG. 15, the housing 1080 further includes an non-magnifying sight 1020 mounted in a vertically stacked relationship relative to the objective 1050 and vertically offset from the optical axis 1090. In some embodiments, the objective 1050 and the eyepiece 1060 are each truncated and flat along an uppermost edge 1053 (i.e., a round lens that has been cut, ground, or otherwise truncated or relieved to remove a section) to provide a clear horizontal line of sight from eye point 1111 through a viewing window (or optic) 1025 of non-magnifying sight 1020. The truncated uppermost edge 1053 of objective 1050 may also enable a relatively large range of eye positions for use of the non-magnifying sight (beyond eye point 1111), which may facilitate fast target acquisition in close-quarter tactical situations.

Viewing window 1025 is positioned predominantly above the optical axis 1090 when both non-magnifying sight 1020 and telescopic sight 1010 are mounted to the rifle such that both telescopic sight 1010 and non-magnifying sight 1020 can be used to aim the rifle with essentially no movement of the viewer's head. The shooter or viewer may easily change between a (magnified) viewing line of sight of telescopic sight 1010 and a non-magnified viewing line of sight 1120 through non-magnifying sight 1020 merely by rotating the viewer's eye 1130 within its socket and with essentially no head movement. Thus, in practice when switching between sights 1010 and 1020, the eye point 1110 of telescopic sight 1010 may be slightly below and spaced apart from an eye point 1111 of viewer's eye 1130 when viewing through non-magnifying sight 1020 along viewing line of sight 1120. In some embodiments, both sights 1010, 1020 may be viewable from coincident eye points.

It will be obvious to those having skill in the art that many changes may be made to the details of the above-described embodiments without departing from the underlying principles of the invention. For example, while the foregoing description of the aiming system 10 is presented in the environment of a tactical rifle, it should be understood that aiming systems and other aspects of the devices described herein may be used in conjunction with other projectile weapons, such as hunting rifles, handguns (pistols), shotguns, archery bows, crossbows, and grenade launchers, for example, and for other sighting needs unrelated to projectile weapons, such as observation, surveying, and the like. The scope of the present invention should, therefore, be determined only by the following claims.

The invention claimed is:

1. A projectile weapon aiming system comprising:
   a telescopic sight including a housing having a mounting surface that facilitates mounting the telescopic sight on a projectile weapon, the housing supporting an optical system of the telescopic sight and positioning the optical system relative to the mounting surface, the optical system forming at a focal plane an image of a distant target, and the optical system including:
   an objective having an optical axis, the objective gathering light that forms the image of the distant target,
   an eyepiece positioned rearward of the objective and the focal plane, and
   a light redirection device positioned rearward of the eyepiece, the light redirection device receiving light from the image via the objective and redirection the rearwardly toward an eye point at which the image of the distant target is viewable, wherein, when the telescopic sight is mounted to the projectile weapon, the eye point is located at a place above a horizontal plane tangent to an uppermost edge of the eyepiece, the horizontal plane vertically offset from the optical axis such that a line parallel to the optical axis and intersecting the eye point does not intersect the eyepiece; and
   a second sight positioned within the housing above the horizontal plane such that the line extends through the second sight and to the distant target without intersecting the optical axis, so that both the telescopic sight and the second sight can be used to aim the projectile weapon with essentially no head movement.

2. The projectile weapon aiming system of claim 1, wherein the light redirection device includes a wedge prism.

3. The projectile weapon aiming system of claim 1, wherein the second sight is a non-magnifying sight, the non-magnifying sight including a viewing window positioned predominantly above the horizontal plane.

4. The projectile weapon aiming system of claim 1, wherein the distant target is viewable via the second sight from a second eye point that is spaced apart from the eye point from which the image of the distant target viewable via the telescopic sight.

5. The projectile weapon aiming system of claim 3, wherein the non-magnifying sight is a reflex sight, and the viewing window is a partial reflector.

6. The projectile weapon aiming system of claim 3, wherein the non-magnifying sight is a holographic weapon sight.

7. The projectile weapon aiming system of claim 1, wherein the optical system of the telescopic sight further includes an aiming reticle located at the focal plane.

8. The projectile weapon aiming system of claim 1, further comprising an erector assembly disposed between the objective and the eyepiece.

9. The projectile weapon aiming system of claim 1, wherein the light redirection device alters the optical path of the image rearwardly and upwardly toward the eye point.

10. A projectile weapon aiming system, comprising:
a telescopic sight including a housing having a mounting surface that facilitates mounting the telescopic sight on a projectile weapon, the housing supporting an optical system of the telescopic sight and positioning the optical system relative to the mounting surface, the optical system forming at a focal plane an image of a field of view of the telescopic sight, the optical system including:
an objective having an optical axis,
a light redirection device that receives light from the objective and redirects the light rearwardly along an optical path segment angled upwardly away from the optical axis, and
an eyepiece positioned rearward of the objective and the focal plane, the optical system defining an eye point spaced rearwardly from the eyepiece at which the image of the field of view is visible through the eyepiece, wherein the eye point is located on a line that is parallel to the optical axis of the objective but does not intersect the eyepiece; and
a second sight positioned in relation to the telescopic sight so that the line intersects the second sight, such that, when the telescopic sight is mounted to the projectile weapon via the mounting surface, a user can utilize both the telescopic sight and the second sight to aim the projectile weapon with a single eye and can switch between the telescopic sight and the second sight with essentially no head movement.

11. The projectile weapon aiming system of claim 10, wherein the light redirection device includes a prism.

12. The projectile weapon aiming system of claim 11, wherein the prism is located rearward of the eyepiece.

13. The projectile weapon aiming system of claim 10, wherein the light redirection device includes a wedge prism positioned rearward of the eyepiece.

14. The projectile weapon aiming system of claim 10, wherein the second sight is positioned within the housing.

15. The projectile weapon aiming system of claim 10, wherein the field of view is viewable via the second sight from a second eye point that is spaced apart from the eye point from which the image of the field of view of the telescopic sight is viewable.

16. The projectile weapon aiming system of claim 10, wherein the second sight is a non-magnifying sight, the non-magnifying sight including a viewing window positioned predominantly above a horizontal plane that is parallel to the optical axis and tangent to an upper edge of the eyepiece that faces away from an initial line of trajectory of the projectile weapon when the telescopic sight is mounted to the projectile weapon via the mounting surface.

17. The projectile weapon aiming system of claim 16, wherein the non-magnifying sight is a reflex sight, and the viewing window is a partial reflector.

18. The projectile weapon aiming system of claim 16, wherein:
the eyepiece includes at least one eyepiece lens that is truncated to form the upper edge of the eyepiece; and
the objective includes at least one truncated objective lens.

19. The projectile weapon aiming system of claim 10, wherein the optical system of the telescopic sight further includes an aiming reticle located at the focal plane.

20. The projectile weapon aiming system of claim 10, further comprising an erector assembly disposed between the objective and the eyepiece.

21. The projectile weapon aiming system of claim 10, wherein the second sight and the telescopic sight are independently mounted in tandem on a common mounting rail of the projectile weapon and separately removable from the common mounting rail.

22. A projectile weapon aiming system, comprising:
a telescopic sight including a housing having a mounting surface that facilitates mounting the telescopic sight on a projectile weapon, the housing supporting an optical system of the telescopic sight and positioning the optical system relative to the mounting surface, the optical system forming at a focal plane an image of a field of view of the telescopic sight, the optical system including:
an objective having an optical axis,
terminal optics including a lens system positioned rearward of the objective and the focal plane, and
a light redirection device that receives light from the objective and redirects the light rearwardly along an optical path segment angled upwardly away from the optical axis,
the optical system defining an eye point spaced rearwardly from the terminal optics at which the image of the field of view is visible through the terminal optics, wherein the eye point is located on a line that is parallel to the optical axis of the objective but does not intersect the terminal optics; and
a second sight positioned in relation to the telescopic sight so that the line intersects the second sight, such that, when the telescopic sight is mounted to the projectile weapon via the mounting surface, a user can utilize both the telescopic sight and the second sight to aim the projectile weapon with a single eye and can switch between the telescopic sight and the second sight with essentially no head movement.

23. The projectile weapon aiming system of claim 22, wherein the light redirection device includes a prism positioned rearward of the lens system of the terminal optics.

24. The projectile weapon aiming system of claim 22, wherein the second sight is positioned within the housing.

25. The projectile weapon aiming system of claim 22, wherein the second sight is a non-magnifying reflex sight.

26. The projectile weapon aiming system of claim 22, wherein the optical system of the telescopic sight further includes an aiming reticle located at the focal plane.

* * * * *